(12) United States Patent
Kasha

(10) Patent No.: US 8,185,621 B2
(45) Date of Patent: May 22, 2012

(54) SYSTEMS AND METHODS FOR MONITORING WEBPAGES

(76) Inventor: John R. Kasha, Rockville, MD (US)

( * ) Notice: Subject to any disclaimer, the term of this patent is extended or adjusted under 35 U.S.C. 154(b) by 321 days.

(21) Appl. No.: 12/211,774

(22) Filed: Sep. 16, 2008

(65) Prior Publication Data

US 2009/0077171 A1 Mar. 19, 2009

Related U.S. Application Data

(60) Provisional application No. 60/972,821, filed on Sep. 17, 2007.

(51) Int. Cl.
*G06F 15/173* (2006.01)
(52) U.S. Cl. ............ 709/224; 715/236; 715/736
(58) Field of Classification Search .......... 709/203, 709/217, 219, 224, 228, 218; 715/736, 230, 715/239, 203; 707/1
See application file for complete search history.

(56) References Cited

U.S. PATENT DOCUMENTS

| | | | | |
|---|---|---|---|---|
| 5,898,836 A | * | 4/1999 | Freivald et al. | 709/218 |
| 5,978,842 A | * | 11/1999 | Noble et al. | 709/218 |
| 6,366,933 B1 | * | 4/2002 | Ball et al. | 715/203 |
| 6,605,120 B1 | * | 8/2003 | Fields et al. | 715/239 |
| 6,615,247 B1 | * | 9/2003 | Murphy | 709/217 |
| 6,826,553 B1 | * | 11/2004 | DaCosta et al. | 707/1 |
| 6,834,306 B1 | * | 12/2004 | Tsimelzon | 709/228 |
| 7,107,535 B2 | * | 9/2006 | Cohen et al. | 715/736 |
| 7,200,804 B1 | * | 4/2007 | Khavari et al. | 715/230 |
| 7,672,875 B2 | * | 3/2010 | Keohane et al. | 705/26 |
| 2003/0025724 A1 | * | 2/2003 | Ullmann et al. | 345/707 |
| 2004/0117479 A1 | * | 6/2004 | Jellum et al. | 709/224 |

* cited by examiner

*Primary Examiner* — Dustin Nguyen
(74) *Attorney, Agent, or Firm* — John R. Kasha; Kasha Law LLC

(57) ABSTRACT

Webpages at a universal resource locator (URL) address are compared at two different times. A request is received from a web browser for a first webpage at the URL. The first webpage is requested and received from the URL at a first time. A selectable webpage is created by editing the first webpage to make it selectable and the selectable web page is sent to the web browser. A selection is received from the web browser that includes a portion of the selectable web page and a frequency. An application is created that retrieves a webpage from the universal resource locator address of the website periodically at the frequency. A second webpage is received from the application that was retrieved from the universal resource locator address at a second time by the application. A portion of the second webpage is compared to the portion of the selectable webpage.

20 Claims, 3 Drawing Sheets

SYSTEMS AND METHODS FOR MONITORING WEBPAGES

CROSS-REFERENCE TO RELATED APPLICATION

This application claims the benefit of U.S. Provisional Patent Application No. 60/972,821 filed Sep. 17, 2007, which is incorporated by reference herein in its entirety.

BACKGROUND OF THE INVENTION

1. Field of the Invention

Embodiments of the present invention relate to systems and methods for monitoring webpages. More particularly, embodiments of the present invention relate to systems and methods for using a Web server to generate an executable for a Web client that can be used to monitor one or more webpages.

2. Background Information

In general, the World Wide Web ("the Web") is a pull system. Information is obtained from the Web by pulling information from a universal resource locator (URL) address. Because the Web is essentially a pull system, it is difficult to determine when and how webpages have been updated or changed.

In view of the foregoing, it can be appreciated that a substantial need exists for systems and methods that can automatically determine when and how webpages have been updated.

BRIEF SUMMARY

Systems and methods are used to compare webpages at a universal resource locator (URL) address at two different times. A system includes a first server, a client, and a second server. The first server includes the universal resource locator address. The client is connected to the first server. The second server is connected to the client and the first server. The second server receives a request from the client for a first webpage at the universal resource locator address. The second server requests the first webpage from the first server and receives the first webpage from the first server at a first time. The second server creates a selectable webpage by editing the first webpage to make it selectable and sends the selectable web page to the client. The second server receives a selection from the client that includes an identifier of a portion of the selectable web page and a frequency. The second server stores the portion of the selectable webpage identified by the identifier. The second server creates an application that retrieves a webpage from the universal resource locator address of the first server periodically at the frequency. The second server makes the application downloadable to the client.

The comparison of webpages at the universal resource locator address at two different times is performed by the second server or the client. If the second server performs the comparison, the second server receives a second webpage from the application executing on the client that was retrieved by the application running on the client from the universal resource locator address at a second time. The second server then compares a portion of the second webpage to the portion of the selectable webpage identified by the identifier and stored on the first server.

If the client performs the comparison, the application is created using the universal resource locator address, the portion of the selectable web page identified by the identifier, and the frequency. The application is downloadable from the second server to the client. Upon execution of the application on the client, the application retrieves a second webpage from the universal resource locator address at a second time and compares a portion of the second webpage to the portion of the selectable webpage identified by the identifier.

Figure 1:
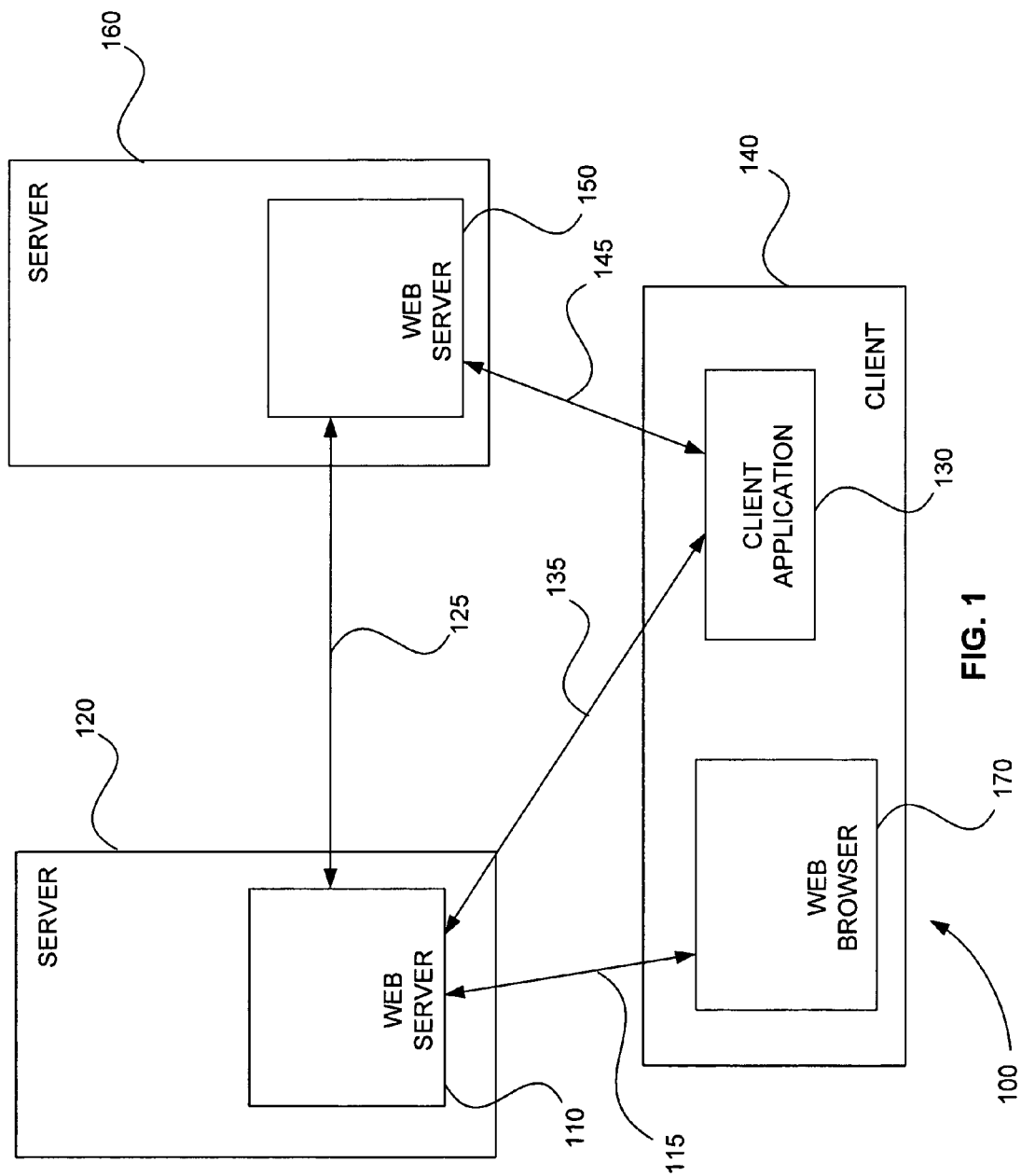
FIG. 1 is a schematic diagram of a system for webpage monitoring that includes a Web server of a server and a client application of a client, in accordance with the present teachings.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Webpage monitoring is often performed when testing webpages. Numerous webpage monitoring tools are available for testing purposes. These tools are sometimes called Web automation testing or scraping tools. Generally these tools are client applications or even fully functional browsers that allow users to create webpage access scenarios that can be replayed as many times as the users wish. An exemplary Web automation testing and scraping tool is iMacros from IOPUS™.

Typically, Web automation testing tools are sophisticated applications that require some programming skills. These Web automation testing tools are, therefore, not useful for the majority of people using the Web. As a result, a substantial need exists for webpage monitoring tools that are accessible to the vast majority of people using the Web.

FIG. 1 is a schematic diagram of a system 100 for webpage monitoring that includes Web server 110 of server 120 and client application 130 of client 140, in accordance with an embodiment of the present invention. A user of client 140, who wishes to monitor a webpage on Web server 150 of server 160, first accesses Web server 110 using Web browser 170 on client 140. Web server 110 is used to create and save monitoring information. Web server 110 can also be used to perform monitoring functions. Web browser 170 can be, but is not limited to, INTERNET EXPLORER®, Firefox, or Chrome. Web browser 170 connects to Web server 110 using communications channel 115. Communications channel 115 is, for example, the Internet.

Web server 110 includes a browser function that allows the user to enter the URL of the webpage on Web server 150 that the user would like to monitor. Web server 110 uses the URL to access Web server 150 to obtain the webpage. Web server 110 essentially acts as a proxy Web browser. Web server 110 connects to Web server 150 using communications channel 125. Communications channel 125 is, for example, the Internet.

Web server 110 sends the webpage back to Web browser 170 using communications channel 115 along with some selectable fields. The selectable fields can include, but are not limited, a field indicating that the webpage should be searched for a keyword, a field allowing entry of a keyword, a field indicating that the webpage should be compared with the same webpage at a later time and a field indicating the frequency in time of how often the webpage should be monitored and compared with the current version of the webpage. The field indicating the frequency in time of how often the webpage should be monitored and compared with the current version of the webpage can include, but is not limited to, time increments including, monthly, weekly, daily, every hour, or every minute.

In another embodiment of the present invention, Web server 110 also parses the webpage to identify portions of the webpage that can be compared or searched. For example, Web server 110 can parse the webpage for information between beginning and ending table hypertext markup language (HTML) tags and can identify this information to the user as a portion of the webpage that can be compared or searched. In other words, system 100 also allows portions of the webpage to be monitored.

If the field indicating that the webpage or a portion of the webpage should be compared with the current version of the webpage or the current version of a portion of the webpage at a later time is selected by the user, then the current version of the webpage or current version of a portion of the webpage and the webpage URL are stored on Web server 110. If the field indicating that the webpage or a portion of the webpage should be searched for a keyword, then the keyword and the webpage URL are stored on Web server 110.

If either webpage comparison or searching is selected by the user using Web browser 170, Web server 110 uses the stored information to generate client application 130 for client 140. The user is queried by Web server 110 to download client application 130 using Web browser 170. If the user accepts the download, client application 130 is downloaded using communications channel 135. Communications channel 135 is, for example, the Internet. Client application 130 can be, but it's not limited to, an executable, a script to be executed by an executable, or data to be used by an executable.

The comparison of the webpage or webpage portion to an earlier stored version of the webpage or webpage portion can be performed either on client 140 or server 120. If the comparison is performed on client 140, client application 130 performs the comparison, for example. Client application 130 can run in the background on client 140. Client application 130 periodically compares the webpage or webpage portion on Web server 150 with the saved version or portion, or searches the webpage or webpage portion on Web server 150 for a keyword, according to the frequency selected by the user. Client application 130 accesses Web server 150 using communications channel 145. Communications channel 145 is, for example, the Internet. If client application 130 detects a difference between the webpage and its previous version or finds the keyword on the webpage, client application 130 notifies the user of client 140 of the event and/or Web server 110.

If the comparison is performed on server 120, Web server 110 performs the comparison, for example. Client application 130 can run in the background on client 140. Client application 130 periodically captures the webpage or webpage portion from Web server 150 and sends the webpage or webpage portion to Web server 110. Client application 130 accesses Web server 150 using communications channel 145. Client application 130 accesses Web server 110 using communications channel 135. Communications channels 145 and 135 are, for example, the Internet. Web server 110 then compares the webpage or webpage portion with the saved version or portion, or searches the webpage or webpage portion for a keyword, according to the frequency selected by the user. If Web server 110 detects a difference between the webpage and its previous version or finds the keyword on the webpage, Web server 110 notifies the user of client 140 and/or client application 130 of the event.

Methods by which client application 130 notifies the user of client 140 can include, but are not limited to, placing a notification on client 140 and sending a message to Web server 110. Methods by which Web server 110 notifies the user of client 140 can include, but are not limited to, emailing the user, sending a text message to the user, saving the notification in the user's account on Web server 110, or sending a message to the user's cellular phone.

In various embodiments, Web server 110 allows the user to record a scenario of webpage accesses. The scenario is then repeated by client application 130 at a time frequency selected by the user and compared with the original scenario or searched for keywords. The scenario can include the entry of passwords or digital certificates.

Figure 2:
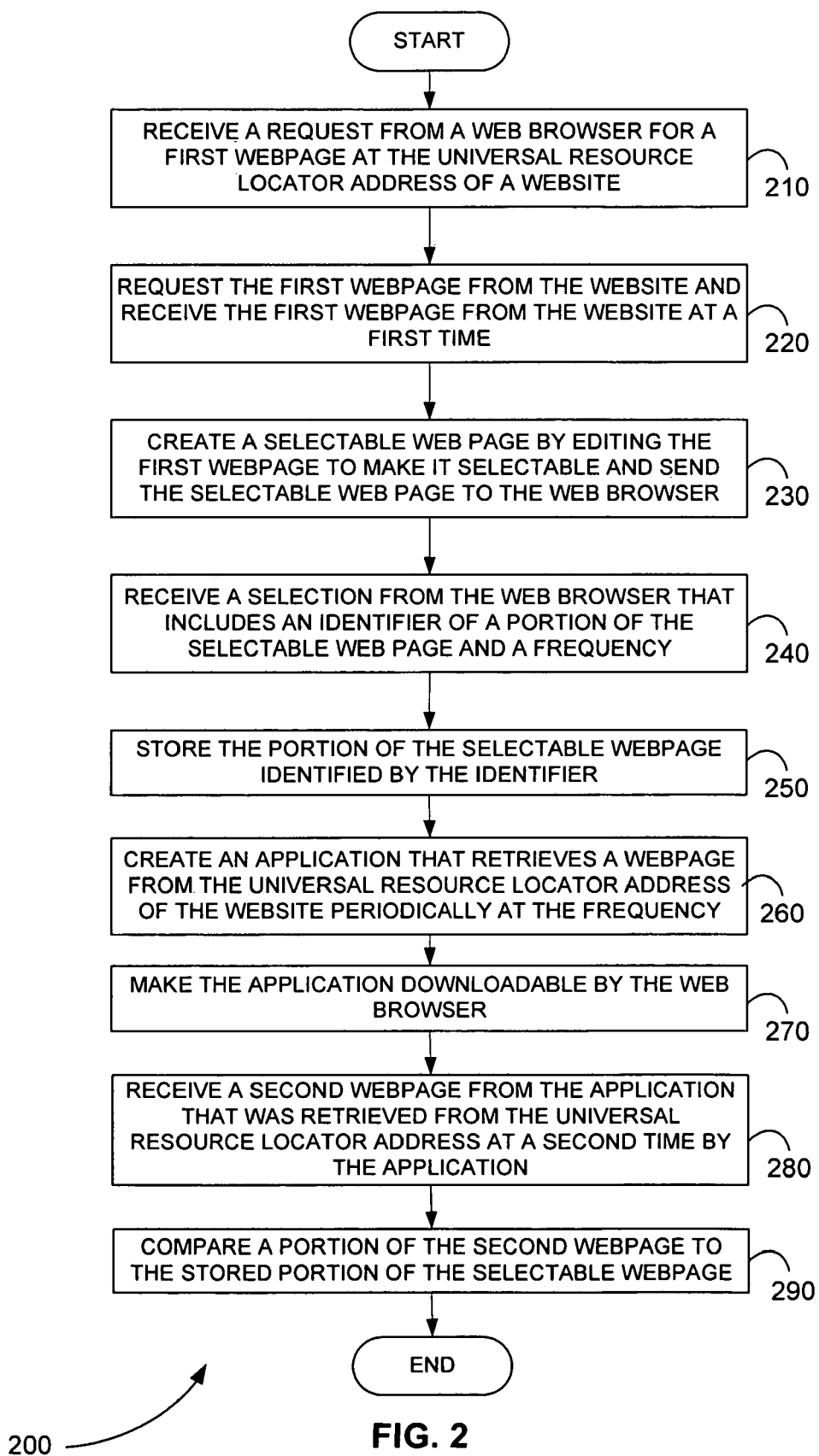
FIG. 2 is a flowchart showing a method for comparing webpages at a universal resource locator address at two different times, in accordance with the present teachings.

FIG. 2 is a flowchart showing a method 200 for comparing webpages at a universal resource locator address at two different times, in accordance with the present teachings.

In step 210 of method 200, a request is received from a web browser for a first webpage at the universal resource locator address of a website.

In step 220, the first webpage is requested from the website and the first webpage is received from the website at a first time.

In step 230, a selectable web page is created by editing the first webpage to make it selectable and the selectable web page is sent to the web browser.

In step 240, a selection is received from the web browser that includes an identifier of a portion of the selectable web page and a frequency. The frequency can be, but is not limited to, a monthly, weekly, daily, every hour, or every minute frequency. The portion of the selectable web page can include the entire webpage, for example.

In step 250, the portion of the selectable webpage identified by the identifier is stored.

In step 260, an application is created that retrieves a webpage from the universal resource locator address of the website periodically at the frequency.

In step 270, the application is made downloadable by the web browser.

In step 280, a second webpage is received from the application that was retrieved from the universal resource locator address at a second time by the application.

In step 290, a portion of the second webpage is compared to the stored portion of the selectable webpage.

In various embodiments of method 200, if the comparison of a portion of the second webpage to the stored portion of the selectable webpage reveals a difference between the portion of the second webpage and the stored portion of the selectable webpage, a user of the web browser is notified. The notification can include, but is not limited to, sending an email to an email account of the user, connecting to the application and instructing the application to notify the user, saving a notification in an account of the user, or sending a message to a cellular phone of the user. The message can include, but is not limited to, a text message or a voice message.

In various embodiments, the selection received from the web browser can include a keyword in addition to the identifier and the frequency. The comparison performed in step 290 can, therefore, include searching the second webpage for the keyword.

In various embodiments, the request received from the web browser can include a scenario of one or more universal resource locator addresses before the universal resource locator address. The application created in step 260 can, therefore, retrieve a webpage from the scenario in addition to the universal resource locator address. In other words, the scenario followed by the web browser to retrieve the first webpage can be followed by the application to find the second webpage.

Figure 3:
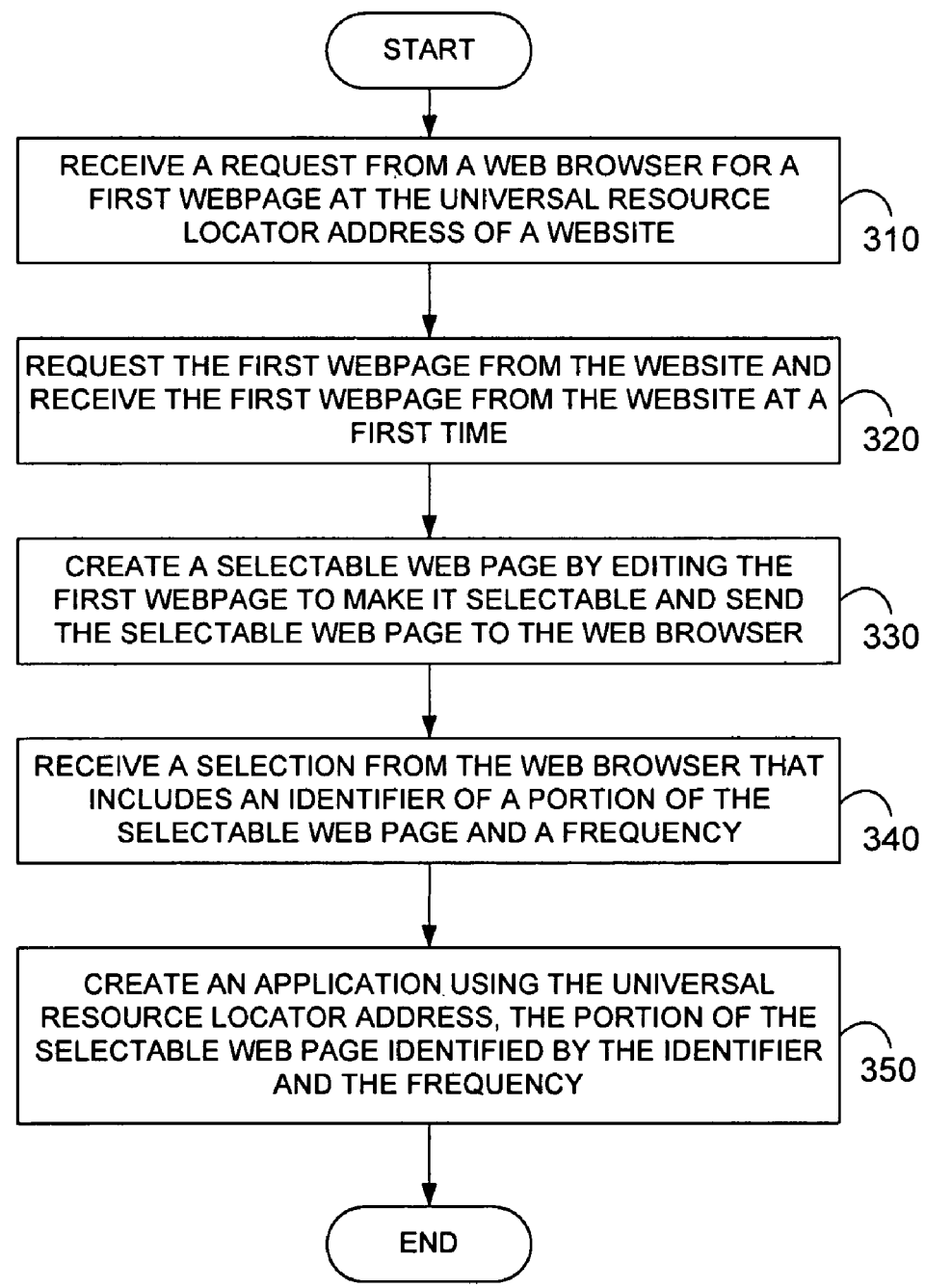
FIG. 3 is a flowchart showing a method for creating an application to compare webpages at a universal resource locator address at two different times, in accordance with the present teachings.

FIG. 3 is a flowchart showing a method 300 for creating an application to compare webpages at a universal resource locator address at two different times, in accordance with the present teachings.

In step 310 of method 300, a request is received from a web browser for a first webpage at the universal resource locator address of a website.

In step 320, the first webpage is requested from the website and the first webpage is received from the website at a first time.

In step 330, a selectable web page is created by editing the first webpage to make it selectable and the selectable web page is sent to the web browser.

In step 340, a selection is received from the web browser that includes an identifier of a portion of the selectable web page and a frequency.

In step 350, an application is created using the universal resource locator address, the portion of the selectable web page identified by the identifier and the frequency. The application is downloadable from the web browser. Upon execution of the application, the application retrieves a second webpage from the universal resource locator address at a second time and compares a portion of the second webpage to the portion of the selectable webpage identified by the identifier.

In various embodiments, if the application compares a portion of the second webpage to the portion of the selectable webpage identified by the identifier and determines a difference between the portion of the second webpage and the portion of the selectable webpage identified by the identifier, the application notifies a user of the web browser.

In various embodiments, the selection from the web browser can include a keyword in addition to the identifier and the frequency. The application can then be created using the keyword in addition to the identifier and the frequency. The application can compare a portion of the second webpage to the portion of the selectable webpage identified by the identifier by searching the second webpage for the keyword.

In accordance with various embodiments, instructions adapted to be executed by a processor to perform a method are stored on a computer-readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the numbered examples appended hereto, and by their equivalents.

What is claimed is:

1. A system for comparing webpages at a universal resource locator address at two different times, comprising:
   a communications link; and
   a first server computer connected to a client device and a second server computer using the communications link that
   receives a request from the client device for a first webpage at a universal resource locator address using the communications link;
   requests the first webpage from the second server computer and receives the first webpage from the second server at a first time using the communications link;
   creates an edited first webpage by editing the first webpage to make it selectable and sends the edited first web-page to the client device using the communications link;
   receives a selection from the client device that includes an identifier of a portion of the edited first web-page using the communications link;
   stores the portion of the edited first webpage identified by the identifier;

creates an application that retrieves a webpage from the universal resource locator address of the second server computer;

downloads the application to the client device using the communications link;

receives a second webpage from the application executing on the client device that was retrieved by the application from the universal resource locator address at a second time using the communications link; and compares a portion of the second webpage to the stored portion of the edited first webpage.

2. The system of claim 1, wherein the first server computer comprises a first Web server, the client device comprises a Web client, and the second server computer comprises a second Web server.

3. The system of claim 1, wherein the client device is connected to the first server computer through the Internet and the second server computer is connected to the first server computer, and the client device through the Internet.

4. The system of claim 1, wherein the first server computer comprises a proxy server.

5. The system of claim 1, further comprising if the first server computer determines a difference between the portion of the second webpage and the stored portion of the edited first webpage, the first server computer notifies a user of the client device.

6. The system of claim 1, wherein the selection from the client device includes a keyword in addition to the identifier and the first server computer compares a portion of the second webpage to the stored portion of the edited first webpage by searching the second webpage for the keyword.

7. The system of claim 1, wherein the request includes a scenario of one or more universal resource locator addresses before the universal resource locator address and the first server computer creates the application that retrieves a webpage from the scenario in addition to the universal resource locator address of the second server computer.

8. A method for comparing webpages at a universal resource locator address at two different times, comprising:

receiving a request from a client processor for a first webpage at a universal resource locator address of a second server processor using a first server processor;

requesting the first webpage from the second server processor and receiving the first webpage from the second server processor at a first time using the first server processor;

creating an edited first web page by editing the first webpage to make it selectable and sending the edited first web page to the client processor using the first server processor;

receiving a selection from the client processor that includes an identifier of a portion of the edited first web page using the first server processor;

storing the portion of the edited first webpage identified by the identifier using the first server processor;

creating an application that retrieves a webpage from the universal resource locator address of the second server processor using the first server processor;

downloading the application to the client processor using the first server processor;

receiving a second webpage from the application that was retrieved from the universal resource locator address at a second time by the application using the first server processor; and comparing a portion of the second webpage to the stored portion of the edited first webpage using the first server processor.

9. The system of claim 1, wherein the selection from the client device includes a frequency in addition to the identifier and the first server computer creates the application to execute periodically at the frequency.

10. The method of claim 8, further comprising if the comparing a portion of the second webpage to the stored portion of the edited first webpage reveals a difference between the portion of the second webpage and the stored portion of the edited first webpage, notifying a user of the client processor.

11. The method of claim 10, wherein the notifying a user of the client processor comprises sending an email to an email account of the user.

12. The method of claim 10, wherein the notifying a user of the client processor comprises connecting to the application and instructing the application to notify the user.

13. The method of claim 10, wherein the notifying a user of the client processor comprises saving a notification in an account of the user.

14. The method of claim 10, wherein the notifying a user of the client processor comprises sending a message to a cellular phone of the user.

15. The method of claim 14, wherein the message is a text message.

16. The method of claim 8, wherein the selection from the client processor includes a keyword in addition to the identifier and the comparing the portion of the second webpage to the stored portion of the edited first webpage comprises searching the second webpage for the keyword.

17. The method of claim 8, wherein the request includes a scenario of one or more universal resource locator addresses before the universal resource locator address and the application retrieves a webpage from the scenario in addition to the universal resource locator address.

18. A system for comparing webpages at a universal resource locator address at two different times, comprising:

a communications link; and a client device connected to a first server computer and a second server computer using the communications link that requests a first webpage at a universal resource locator address of the second server computer from the first server computer using the communications link;

receives an edited first webpage from the first server computer using the communications link, wherein the first server received the first webpage from the second server and edited the first webpage producing the edited first webpage;

sends a selection to the first server computer that includes an identifier of a portion of the edited first webpage using the communications link, wherein the first server computer stores the portion of the-edited first webpage identified by the identifier and creates an application that retrieves a webpage from the universal resource locator address of the second server computer;

downloads the application using the communications link and executes the application at a second time;

sends a second webpage retrieved by the application to the first server computer using the communications link, wherein the first server computer compares a portion of the second webpage to the stored portion of the edited first webpage.

19. The system of the claim 9, wherein the frequency comprises one of monthly, weekly, daily, every hour, or every minute.

20. The method of claim 8, wherein the selection from the client processor includes a frequency in addition to the identifier and the first server processor creates the application to execute periodically at the frequency.

* * * * *